US009647286B2

(12) United States Patent
Jamal et al.

(10) Patent No.: US 9,647,286 B2
(45) Date of Patent: May 9, 2017

(54) SYSTEM AND METHOD FOR GENERATING POWER AND ENHANCED OIL RECOVERY

(71) Applicant: Saudi Arabian Oil Company, Dhahran (SA)

(72) Inventors: Aqil Jamal, Dhahran (SA); Thang Pham, Dhahran (SA); Aadesh Harale, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 734 days.

(21) Appl. No.: 13/678,942

(22) Filed: Nov. 16, 2012

(65) Prior Publication Data

US 2013/0118735 A1    May 16, 2013

Related U.S. Application Data

(60) Provisional application No. 61/560,619, filed on Nov. 16, 2011.

(51) Int. Cl.
*H01M 8/06*    (2016.01)
*H01M 8/0662*    (2016.01)
(Continued)

(52) U.S. Cl.
CPC ............. *H01M 8/0675* (2013.01); *C01B 3/38* (2013.01); *C01B 31/20* (2013.01); *E21B 43/164* (2013.01);
(Continued)

(58) Field of Classification Search
CPC ...................................................... H01M 8/18
(Continued)

(56) References Cited

U.S. PATENT DOCUMENTS 6,841,279 B1    1/2005 Foger
7,097,925 B2    8/2006 Keefer
(Continued)

FOREIGN PATENT DOCUMENTS

CN    104094461 A    10/2014
EP    2780966 A2    9/2014
(Continued)

OTHER PUBLICATIONS

PCT Notification of Transmittal of the International Search Report and the Written Opinion of the International Searching Authority, or the Declaration; dated May 21, 2013; International Application No. PCT/US2012/065431; International File Date: Nov. 16, 2012.
(Continued)

*Primary Examiner* — Basia Ridley
*Assistant Examiner* — James Erwin
(74) *Attorney, Agent, or Firm* — Bracewell LLP; Constance G. Rhebergen; Kevin R. Tamm (57) ABSTRACT

A method for producing a purified carbon dioxide product suitable for EOR and surplus electricity uses a vaporous hydrocarbon feed and a SOFC system. A SOFC system includes a condensate removal system, an acid gas removal system, a hydrodesulfurization system, a sorption bed system, a pre-reformer, a solid oxide fuel cell, a CO2 separations system and a CO2 dehydration system operable to form the purified carbon dioxide product, where the SOFC system is operable to produce surplus electricity from the electricity produced by the solid oxide fuel cell. A method of operating the pre-reformer to maximize the internal reforming capacity of a downstream solid oxide fuel cell uses a pre-reformer fluidly coupled on the upstream side of a solid oxide fuel cell. A method of enhancing hydrocarbon fluid recovery from a hydrocarbon-bearing formation using a SOFC system.

14 Claims, 1 Drawing Sheet

(51) Int. Cl.
  *H01M 8/0612*  (2016.01)
  *H01M 8/18*  (2006.01)
  *E21B 43/16*  (2006.01)
  *H01M 8/0668*  (2016.01)
  *H01M 8/04089*  (2016.01)
  *E21B 43/34*  (2006.01)
  *C01B 31/20*  (2006.01)
  *C01B 3/38*  (2006.01)
  *H01M 8/124*  (2016.01)

(52) U.S. Cl.
  CPC ......... *E21B 43/34* (2013.01); *H01M 8/04097* (2013.01); *H01M 8/0618* (2013.01); *H01M 8/0668* (2013.01); *H01M 8/0681* (2013.01); *H01M 8/0687* (2013.01); *H01M 8/18* (2013.01); *C01B 2203/0233* (2013.01); *C01B 2203/04* (2013.01); *C01B 2203/0475* (2013.01); *H01M 2008/1293* (2013.01); *Y02P 90/70* (2015.11)

(58) Field of Classification Search
  USPC ........................................................ 429/425
  See application file for complete search history.

(56) References Cited

U.S. PATENT DOCUMENTS

| | | | |
|---|---|---|---|
| 7,396,603 B2 | 7/2008 | Farooque | |
| 7,459,226 B2 | 12/2008 | Huijsmans | |
| 7,648,541 B2 | 1/2010 | Bolden | |
| 7,875,402 B2 | 1/2011 | Hershkowitz | |
| 7,883,803 B2 | 2/2011 | McElroy | |
| 2003/0143448 A1 | 7/2003 | Keefer | |
| 2004/0031388 A1 | 2/2004 | Hsu | |
| 2004/0040715 A1 | 3/2004 | Wellington | |
| 2004/0108111 A1 | 6/2004 | Vinegar | |
| 2005/0255356 A1 | 11/2005 | Huijsmans | |
| 2006/0115691 A1 | 6/2006 | Hilmen et al. | |
| 2008/0072752 A1 | 3/2008 | Kumar | |
| 2008/0283249 A1 | 11/2008 | Zubrin | |
| 2009/0152868 A1 | 6/2009 | Beck | |
| 2009/0155649 A1 | 6/2009 | Cui et al. | |
| 2009/0155650 A1 | 6/2009 | Cui | |
| 2010/0038082 A1 | 2/2010 | Zubrin | |
| 2010/0064725 A1 | 3/2010 | Chieng et al. | |
| 2011/0130474 A1 | 6/2011 | Moon et al. | |
| 2011/0165477 A1* | 7/2011 | Yamamoto | B01D 53/0423 429/410 |
| 2011/0207002 A1 | 8/2011 | Powell et al. | |

FOREIGN PATENT DOCUMENTS

| | | |
|---|---|---|
| JP | S62-114628 A | 5/1987 |
| JP | 2015502639 A | 1/2015 |
| KR | 20140098135 A | 8/2014 |
| WO | 2013074875 A2 | 5/2013 |

OTHER PUBLICATIONS

PCT International Preliminary Report on Patentability, for related PCT application PCT/US2012/065431, dated May 20, 2014.
PCT Communication Relating to the Results of the Partial International Search; dated Feb. 4, 2013; International Application No. PCT/US2012/065431; International File Date: Nov. 16, 2012.
Sasaki et al, Chemical durability of Solid Oxide Fuel Cells: Influence of impurities on long-term performance, Abstract, Journal of Power Sources, Nov. 2011.
Timmermann et al, Kinetics of (reversible) internal reforming of methane in solid oxide fuel cells under stationary and APU conditions, Abstract, Journal of Power Sources, Jan. 2010.

* cited by examiner

SYSTEM AND METHOD FOR GENERATING POWER AND ENHANCED OIL RECOVERY

CROSS-REFERENCE TO RELATED PATENT APPLICATIONS

This application claims priority from U.S. Provisional Application No. 61/560,619, filed Nov. 16, 2011. For purposes of United States patent practice, this application incorporates the contents of the Provisional Application by reference in its entirety.

BACKGROUND OF THE INVENTION

1. Field of Invention

The field of invention relates to a solid oxide fuel cell (SOFC) process and system. More specifically, the field relates to using a SOFC process and system using a vaporous hydrocarbon for producing electricity and carbon dioxide suitable for enhanced oil recovery (EOR).

2. Description of the Related Art

For long-time producing oil fields, FOR using carbon dioxide is a routine operation. Carbon dioxide injection repressurizes the field and fosters chemical reactions in the hydrocarbon-bearing formation that encourages additional hydrocarbon production. Purified carbon dioxide—at least 95 mole percent purity—is useful for EOR because it minimizes the likeliness of unknown or undesirable reactions in the hydrocarbon-bearing formation.

Both crude oil and natural gas production and refining are power-intensive enterprises. Recovery of hydrocarbon materials usually occurs in remote locations, including off-shore and away from significant population centers, where power conveyance infrastructure does not exist, is uneconomical or is physically impracticable. In such cases, local power generation facilities are the only realistic option.

Environmental conditions affect smaller, local power production facilities. Day-to-day cooling water and air temperature variations can leave some parts of a power generation system operationally limited, for example, cooling capacity. The local hydrocarbon feed stock can have impurities or can change in composition due to variations in the seasons. In addition, every location has access to hydrocarbon feed stock that is slightly different in hydrocarbon, contaminant and inert composition, making a "universal" system more difficult to design.

Power generation facilities create three major products: electricity, steam and carbon dioxide off-gas. The electricity and steam (generated as part of the process of combusting fuel as well as heating and cooling electricity-generating processes) are useful in all aspects of hydrocarbon-production and refining operations. With stringent greenhouse gas monitoring and reporting requirements, carbon dioxide is not jettisoned into the air simply as a "waste". Instead, it is desirable to capture and find uses for the carbon dioxide produced or to minimize the amount of carbon dioxide emitted.

A power generation system and process that handles not only variability in hydrocarbon feed, including having the capability to take less refined vaporous feeds; is operable to provide electrical power at remote locations; and has the means for capturing and refining the carbon dioxide for use instead of disposing it, is desirable.

SUMMARY OF THE INVENTION

A method for producing a purified carbon dioxide product suitable for enhanced oil recovery (EOR) and surplus electricity uses a vaporous hydrocarbon feed and a SOFC system. The method includes the step of introducing the vaporous hydrocarbon into the SOFC system. The method includes the step of operating the SOFC system such that a desulfurized process gas forms and passes into a pre-reformer. The method includes the step of introducing steam into the pre-reformer. The method includes the step of operating the pre-reformer such that the non-methane alkanes in the desulfurized process gas convert into methane and carbon oxides using the introduced steam and in the presence of the pre-reforming catalyst, which causes the reformed process gas to form, and to pass the reformed process gas into the solid oxide fuel cell. The method includes the step of operating the SOFC system such that the purified carbon dioxide product and surplus electricity are produced.

A SOFC system for producing a purified carbon dioxide product suitable for EOR and surplus electricity from a vaporous hydrocarbon feed includes a condensate removal system, an acid gas removal system, a hydrodesulfurization system, a sorption bed system, a pre-reformer, a solid oxide fuel cell, a $CO_2$ separations system and a $CO_2$ dehydration system operable to form the purified carbon dioxide product, where the SOFC system is operable to produce surplus electricity from the electricity produced by the solid oxide fuel cell.

A method of operating the pre-reformer to maximize the internal reforming capacity of a solid oxide fuel cell uses a pre-reformer fluidly coupled on the upstream side of the solid oxide fuel cell. The pre-reformer is operable to convert non-methane alkanes in a desulfurized process gas using steam and in the presence of an active metal pre-reforming catalyst into methane and carbon oxides, which forms a reformed process gas as the product. The method includes the step of introducing the desulfurized process gas into the pre-reformer. The desulfurized process gas has a temperature in the range of from about 200° C. to about 450° C. The desulfurized process gas includes methane and non-methane alkanes. The method includes introducing a superheated steam into the pre-reformer. The superheated steam has a temperature in a temperature in the range of from about 250° C. to about 500° C. and a pressure in a range of from about 8 bars to about 12 bars. The steam-to-carbon ratio (SCR) of the introduced superheated steam to the introduced desulfurized process gas is in a range of from about 0.5 to about 3.0. An embodiment of the method has a SCR in a range of from about 0.5 to about 1.5. An embodiment of the method has a SCR in a range of from about 1.5 to about 3.0. The method includes the step of operating the pre-reformer such that a reformed process gas forms. The reformed process gas includes methane, carbon oxides and hydrogen. The reformed process gas has a methane selectivity in a range of from about 0.90 to about 0.99.

A method of enhancing hydrocarbon fluid recovery from a hydrocarbon-bearing formation using a SOFC system. The hydrocarbon-bearing formation contains a hydrocarbon fluid containing associated gas. The formation is accessible both through a production well and a separate injection well. The SOFC system is operable to receive associated gas and produce a purified carbon dioxide product suitable for enhanced oil recovery and surplus electricity from the associated gas. The method includes the step of producing the hydrocarbon fluid from the hydrocarbon-bearing formation using the production well. The method includes the step of separating the associated gas from the produced hydrocarbon fluid. The method includes the step of introducing the associated gas into the SOFC system. The method includes the step of operating the SOFC system to produce a purified carbon dioxide product for enhanced oil recovery and surplus electricity. The method includes the step of introducing into the hydrocarbon-bearing formation the purified carbon dioxide product using the injection well.

The SOFC system and method of use produces both an EOR-quality carbon dioxide product and surplus electricity useful for other operations, including oil and gas recovery and refining. "Surplus electricity" means electricity produced in excess of the requirements of the SOFC system, including the electrochemical reactions that occur internally in the solid oxide fuel cell. The SOFC system is flexible in that it can use a variety of vaporized hydrocarbons as a feedstock, including natural gas, methane, associated gas and other hydrocarbons placed into a vapor state. Fostering on-site electrical power generation and carbon dioxide production from a single system significantly lowers the overall external requirement for fuels and chemicals to operate a recovery the system as well as eliminate the need to provide carbon dioxide for EOR. On-site production of carbon dioxide and electricity significantly reduces infrastructure and makes exploiting remote oil and gas production sites more feasible. The SOFC system also has the ability to refine carbon dioxide to a high enough purity for use as a feed stock for other chemical processes.

A pre-reformer included as part of the SOFC system addresses the variability of the types, quality and conditions of the vaporous hydrocarbon feed, which maximizes the number and types of potential feedstocks eligible for use. The inclusion of the pre-reformer in the SOFC system creates several process-related operational benefits. Higher carbon hydrocarbons (that is, non-methane hydrocarbons) are more chemically reactive than methane. Converting all of the non-methane hydrocarbons into methane stabilizes the feed composition for the solid oxide fuel cell into hydrogen, carbon oxides, water and methane. Compositional stability of the hydrocarbon feed stream to the solid oxide fuel cell, in turn, stabilizes electrical generation and the internal reformation reactions that occur in the solid oxide fuel cell. Supplying methane instead of higher carbon hydrocarbons also improves the efficiency of the solid oxide fuel resulting in greater electrical power generation. Pre-reforming the feed to the solid oxide fuel cell also permits the solid oxide fuel cell to operate at a lower steam-to-carbon ratio (SCR) than required for full reforming of a variable hydrocarbon feed. Internal reformation of methane in the solid oxide fuel cell into hydrogen and carbon monoxide is endothermic, which removes a significant amount of heat. Less cooling overall is required for the SOFC system versus systems that do not use a pre-reformer. The pre-reformer also acts as a "sacrificial sulfur sink" to any potential sulfur breakthrough. Although embodiments of the SOFC system include desulfurization systems, the pre-reformer catalyst adds another layer of protection for the solid oxide fuel cell catalysts.

BRIEF DESCRIPTION OF THE DRAWINGS

These and other features, aspects, and advantages of the present invention are better understood with regard to the following Detailed Description of the Preferred Embodiments, appended Claims, and accompanying FIGURES, where:

DETAILED DESCRIPTION OF THE PREFERRED EMBODIMENTS

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the an to which this invention belongs unless defined otherwise.

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and intended use.

Spatial terms describe the relative position of an object or a group of objects relative to another object or group of objects. The spatial relationships apply along vertical and horizontal axes. Orientation and relational words including "upstream" and "downstream" and other like terms are for descriptive convenience and are not limiting unless otherwise indicated.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided. "Substantially free" means less than 1% by the indicated unit of measure, and preferably less than 0.1%.

Where reference is made in the Specification and appended Claims to a method comprising two or more defined steps, the defined steps can be carried out in any order or simultaneously except where the context excludes that possibility.

Figure 1:
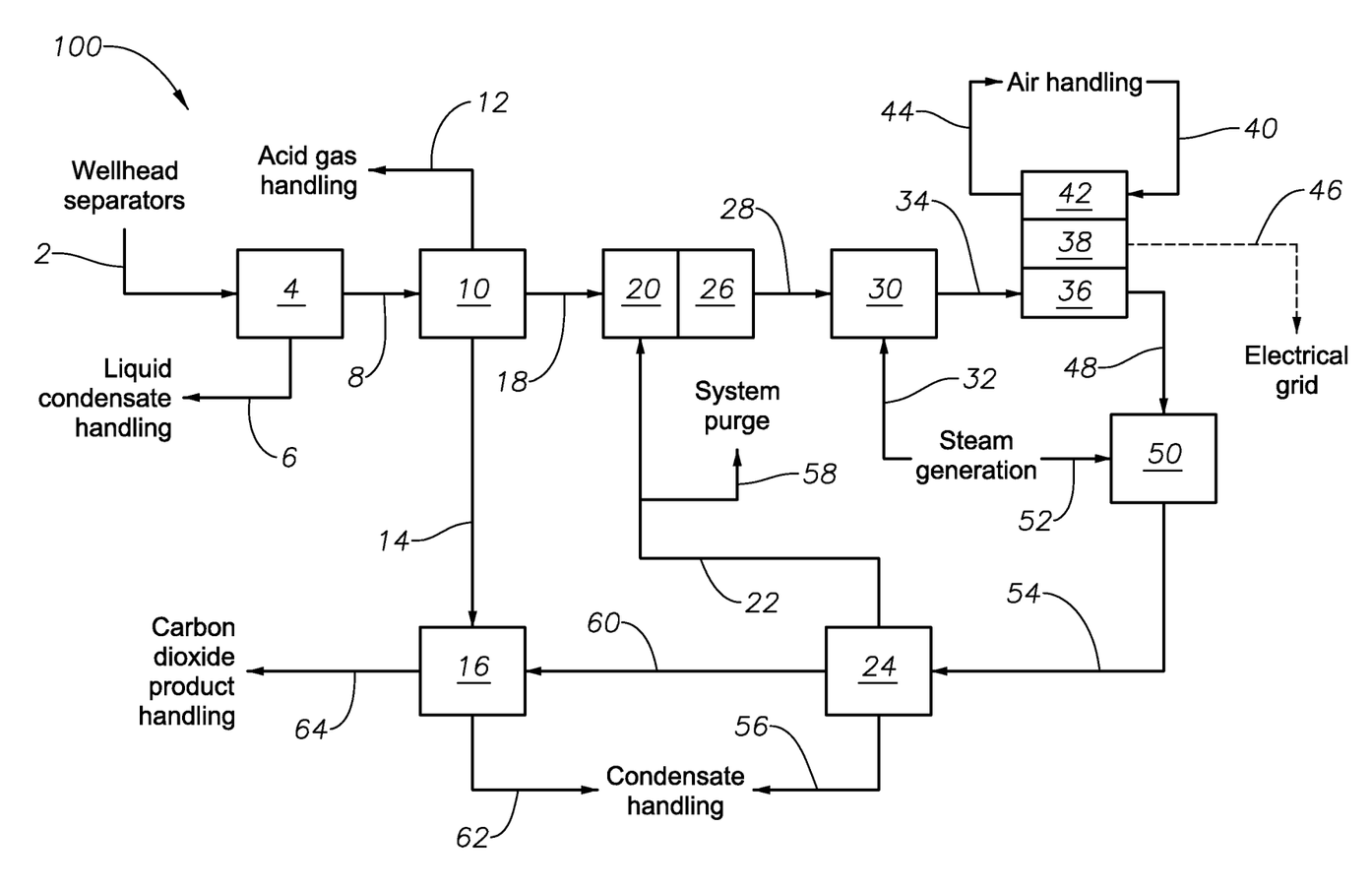
FIG. 1 is a process flow diagram of an embodiment of a SOFC system.

FIG. 1

FIG. 1 shows a process flow diagram of an embodiment of a SOFC system. FIG. 1 is a simple diagram for ease of description. Those of ordinary skill in the art understand that such systems are complex structures with ancillary equipment and subsystems that render them operable for their intended purpose.

SOFC system 100 is operable to generate surplus electricity and a refined carbon dioxide product suitable for enhanced oil recovery from a vaporous hydrocarbon feed stock. Associated gas conduit 2 introduces associated gas into SOFC system 100 for conversion into EOR quality carbon dioxide and surplus electricity. Associated gas conduit 2 couples to wellhead separators outside of SOFC system 100 and gathers associated gas separated from produced crude oil and liquid condensate.

Associated gas conduit 2 couples to the process gas inlet of condensate removal system 4 and introduces associated gas into condensate removal system 4. Condensate removal system 4 is operable to separate associated gas into a dry sour gas and a gas condensate. Condensate conduit 6 couples to condensate removal system 4 through a liquid outlet and passes the gas condensate to a condensate processing operation outside of SOFC system 100.

Dry sour gas conduit 8 couples the process gas outlet of condensate removal system 4 to the process gas inlet of acid gas removal system 10 and introduces dry sour gas to acid gas system 10. Acid gas removal system 10 separates the dry sour gas into an acid gas, a carbon dioxide-rich gas and a sweet process gas. Acid gas conduit 12 couples to acid gas removal system 10 and provides acid gas to sulfur processing operations outside of SOFC system 100. Carbon dioxide gas conduit 14 couples to acid gas removal system 10 and directs the carbon dioxide-rich gas to CO2 processing system 16.

Sweet process gas conduit 18 couples the process gas outlet of acid gas removal system 10 to the process gas inlet of hydrodesulfurization system 20 and introduces sweet process gas to hydrodesulfurization system 20. System recycle conduit 22 couples hydrodesulfurization system 20 to CO2 separations system 24 and introduces a hydrogen-rich recycle gas into hydrodesulfurization system 20. Hydrodesulfurization system 20 is operable to convert the hydrogen introduced from system recycle conduit 22 and organic sulfur compounds introduced from sweet process gas conduit 18 into hydrogen sulfide. The process gas from hydrodesulfurization system 20 passes into sorbent bed 26, which removes the hydrogen sulfide from the process gas, forming a desulfurized process gas.

Desulfurized process gas conduit 28 couples the process gas outlet of sorbent bed 26 to the process gas inlet of pre-reformer 30 and introduces desulfurized process gas, containing both methane and non-methane alkanes, to pre-reformer 30. Superheated steam conduit 32 couples to pre-reformer and introduces superheated steam into pre-reformer 30 from the steam generation system outside of SOFC system 100. Pre-reformer 30 is operable to convert non-methane hydrocarbons in the desulfurized process gas and water from the superheated steam into methane, carbon oxides, hydrogen and water, forming a reformed process gas.

Reformed process gas conduit 34 couples the process gas outlet of pre-reformer 30 with the process gas inlet on anode side 36 of solid oxide fuel cell 38 and introduces the reformed process gas to anode side 36 of solid oxide fuel cell 38. Anode side 36 internally reforms the methane and water in the reformed process gas into hydrogen and carbon oxides.

Compressed air conduit 40 couples to cathode side 42 of solid oxide fuel cell 38 and introduces compressed air into cathode side 42 from the air handling system outside of SOFC system 100. Solid oxide fuel cell 38 extracts the oxygen from the compressed air on cathode side 42, forming an oxygen-deficient air on cathode side 42. Cathode deficient air conduit 44 couples to cathode side 42 passes the oxygen-deficient air from the SOFC 38 to the air handling system outside of SOFC system 100.

Solid oxide fuel cell 38 promotes the reaction of extracted oxygen anions with hydr and carbon monoxide on anode side 36 to create an anode off-gas with water and carbon dioxide in anode side 36. The electrochemical reaction between hydrogen and oxygen and between carbon monoxide and oxygen frees electrons, which solid oxide fuel cell 38 aggregates. Solid oxide fuel cell 38 uses some of the free electrons to further promote the electrochemical reaction via oxygen extraction in cathode side 42. Electrical conduit 46 passes electricity provided by solid oxide fuel cell 38. Electrical conduit 46 provides surplus electricity to the electrical distribution system outside of SOFC system 100.

Anode off-gas conduit 48 couples the process gas outlet of anode side 36 of solid oxide fuel cell 38 to the process gas inlet of water-gas shift reactor 50 and introduces anode off-gas, containing some carbon monoxide and water, into water-gas shift reactor 50. Superheated steam conduit 52 couples to water-gas shift reactor 50 and introduces superheated steam into water-gas shift reactor 50 from the steam generation system outside of SOFC system 100. Water-gas shift reactor 50 is operable to convert the carbon monoxide and water in the introduced anode off-gas into carbon dioxide and hydrogen using the superheated steam, forming a shifted anode off-gas.

Shifted anode off-gas conduit 54 couples the process gas outlet of water-gas shift reactor 50 to the process gas inlet of CO2 separation system 24 and introduces shifted anode off-gas to CO2 separation system 24. CO2 separation system 24 is operable to separate the shifted off-gas into a carbon dioxide-rich gas, the hydrogen-rich recycle gas previously described and condensed water. System recycle conduit 22 couples CO2 separations system 24 to hydrodesulfurization system 20 and passes the hydrogen-rich recycle to hydrodesulfurization system 20. Water condensate conduit 56, coupled to CO2 separation system 24, directs the condensed water to condensate handling outside of the solid oxide fuel cell process 100. Water condensate conduit 56 couples to CO2 separation system 24 and provides the condensed water to the condensate handling operations outside of SOFC system 100. System purge conduit 58 couples to system recycle conduit 22 and provides a system purge for a portion of the hydrogen-rich recycle gas from CO2 separation system 24.

Carbon dioxide gas conduit 14 couples the carbon dioxide gas outlet of acid gas removal system 10 to the carbon dioxide inlet of CO2 processing system 16 and introduces carbon dioxide-rich gas to CO2 processing system 16. Carbon dioxide gas conduit 60 couples the carbon dioxide gas outlet of CO2 separation system 24 to the carbon dioxide inlet of CO2 processing system 16 and introduces carbon dioxide-rich gas to CO2 processing system 16. CO2 separation system 24 is operable to separate, refine, dewater and compress the carbon dioxide-rich gas, forming a refined carbon dioxide product and condensed water. Water condensate conduit 62 couples to the liquid outlet of CO2 processing system 16 and provides the condensed water to the condensate handling operations outside of SOFC system 100. CO2 product conduit 64 couples to the carbon dioxide product outlet of CO2 processing system 16 and passes the refined carbon dioxide product to the carbon dioxide handling operation outside of SOFC system 100.

Vaporous Hydrocarbon

The SOFC system is operable to receive and process a vaporous hydrocarbons as the feed stock for producing both surplus electricity and the refined carbon dioxide product. Examples of vaporous hydrocarbons useful as feeds include natural gas; vaporized liquid condensates, naphtha and other light petroleum liquid fractions; synthetic gases, including wood, tar and coal gas; methane, ethane, propane, liquidized petroleum gas (LPG), butanes, pentanes and other pure or mixtures of previously refined gases and tight liquid alkanes, cycloalkanes and aromatics; and hydrocarbon gas associated with hydrocarbon fluids produced from underground hydrocarbon-bearing formations.

Associated gas separated from field separation units and overheads of knockout pots from crude oil and liquid condensate production is a vaporous hydrocarbon feed. Field separation units at petroleum production wellheads provide rough, physical separation of gases from liquids. A network of associated gas feed headers aggregates associated gas from multiple production well and field knockout units. The network directs the gas towards gas recovery and processing systems, including the SOFC system, as a hydrocarbon feed.

The majority portion of associated gas is methane. Associated gas also includes portions of non-methane alkanes, including ethane, propane, butanes, pentanes, hexanes, and higher carbon alkanes and cyclo-alkanes. Associated gas can include an amount of low-carbon aromatic compounds, including the BTEX compounds. Associated gas often includes an amount of inert gases, including nitrogen and noble gases. Heterorganic compounds, including organic sulfurs (for example, mercaptans, thiols and disulfides), oxygen bearing and nitrogen bearing compounds, are often present in parts per million. Other compounds that are typically present in associated gas include carbon oxides, hydrogen sulfide, oxygen, water and hydrogen.

Condensate Removal System

The SOFC system optionally includes a condensate removal system. In some cases, especially when using associated gas as a feedstock, the vaporous hydrocarbon feed includes higher-carbon species that are desirable to extract from the introduced hydrocarbon stream before continuing the process the feed. The condensate removal system is operable to receive the vaporous hydrocarbon feed and separate higher-carbon species from the introduced vaporous hydrocarbons to form both a liquid condensate and a dry sour gas as products. Removing C5+ hydrocarbons from the process gas as liquid condensate renders the SOFC process easier to control, uses less energy to maintain a higher temperature and lower pressure process gas stream and recovers commodity chemicals for separate processing. The dry sour gas is a system product typically made of methane, light alkanes, heterorganic compounds including organic sulfurs, hydrogen sulfide, inerts and carbon oxides.

An embodiment of the SOFC system includes a condensate removal system that utilizes cryogenically chilled liquids, for example ethylene glycol and propane, to cool the vaporous hydrocarbons. Cooling the vaporous hydrocarbons forms the liquid condensate and the dry sour gas. Cooling the vaporous hydrocarbons also removes any water. An embodiment of the SOFC system uses turbo expanders to enhance the performance of the cryogenically chilled liquid condensate removal system.

An embodiment of the SOFC system includes a condensate removal system that utilizes an absorption-extraction process that removes hydrocarbon condensates with absorbent solvents from the vaporous hydrocarbons. The lean absorbing solvent has an affinity with and selective absorbs higher-carbon alkanes and aromatic species from the vaporous hydrocarbons, forming fat absorbing solvent and the dry sour process gas. An extraction tower recovers liquid condensate from the fat absorbing solvent. The absorption-extraction process has the advantage of not requiring the use of a cryogenic process.

Acid Gas Removal System

The SOFC system optionally includes an acid gas removal system. In some cases, especially when using field-extracted hydrocarbons or associated gas as a feedstock, the vaporous hydrocarbon feed includes hydrogen sulfide that should be removed. Sulfur compounds are poisons to most metal oxide catalysts in downstream processing units. The acid gas removal system couples to and receives dry sour gas as a feed from the condensate removal system. The acid gas removal system is operable to extract hydrogen sulfide from the introduced dry sour gas. An embodiment of the SOFC system process is operable to extract carbon dioxide from the introduced dry sour gas. Upon selectively removing both hydrogen sulfide and carbon dioxide (and often some carbon monoxide, if present) from the introduced dry sour gas, a carbon dioxide-rich gas, an acid gas and a dry sweet gas form as products. Carbon dioxide is a desirable product of the SOFC process but acts as a diluent in downstream processing units.

The acid gas product is hydrogen sulfide suitable for chemical processing outside of the SOFC system, including conversion by a Claus process into elemental sulfur or for producing sulfuric acid. The product dry sweet process gas of the acid gas removal system typically includes methane, light alkanes, heterorganic compounds including organic sulfurs and inerts. In an embodiment of the SOFC process that produces a carbon dioxide-rich gas, the carbon dioxide composition is substantially five of non-carbon dioxide components on a mole basis.

An embodiment of the SOFC system includes an acid gas removal system that utilizes reactive liquids to extract hydrogen sulfide and carbon dioxide from the dry sour process gas, forming the dry sweet process gas. Examples of amines that are suitable reactive liquids include monoethanolamine (MEA), diethanolamine (DEA), methyldiethanolamine (mDEA), diisopropylamine (DIPA) and diglycolamine (DGA) (aminoethoxyethanol).

An embodiment of the SOFC system includes an acid gas removal system that utilizes a physical solvent to extract both hydrogen sulfide and carbon dioxide from the dry sour process gas, forming the dry sweet process gas. Examples of physical solvents and processes using them include dimethyl ethers of polyethylene glycol (DEPG), used in the SELEXOL process (UOP LLC; Des Plaines, Ill.); methanol, used in the RECTISOL® process (Lurgi AG; Frankfurt, Germany); n-methyl-2-pyrrolidone (NMP), used in the PURISOL® process (Lurgi AG); and propylene carbonate (PC), used in the FLUOR SOLVENT process (Fluor Corp.; Irving Tex.). A process using the physical solvent can extract the hydrogen sulfide and carbon dioxide separately or simultaneously. An embodiment of the SOFC process uses a physical solvent to extract hydrogen sulfide and the carbon dioxide and then release the hydrogen sulfide and the carbon dioxide separately to form separate carbon dioxide-rich gas and acid gas products.

An embodiment of the SOFC system couples the acid gas removal system to the CO2 dehydration system. An embodiment of the SOFC process passes carbon dioxide-rich gas produced in the acid gas removal system directly to the CO2 dehydration system as a bypass stream for refinement and end use. The carbon dioxide-rich gas is at least 95% carbon dioxide on a mole basis. An embodiment of the SOFC process includes where the carbon dioxide-rich gas from the acid gas removal system is at least 98% carbon dioxide on a mole basis.

Hydrodesulfurization and Sorption Bed System

The SOFC system includes a hydrodesulfurization system. The hydrodesulfurization system couples to and receives dry sweet gas as a feed from the acid gas removal system. The hydrodesulfurization system (also called a "hydrotreater") is operable to convert the heterorganic compounds in the introduced dry sweet gas, especially organic sulfur compounds, with hydr and in the presence of the hydrotreating catalyst into alkanes and compounds that can be absorbed onto the sorption bed material of the sorption bed. Organic sulfur compounds upon cracking can poison metal oxide catalysts. Compounds that can be absorbed on the sorption bed include hydrogen sulfide, ammonia and water. The conversion of the heterorganic compounds into absorbable compounds converts the dry sweet gas into a treated process gas that includes hydrogen sulfide, ammonia, water, hydrogen, methane and non-methane alkanes.

The hydrodesulfurization process uses hydrogen to hydrotreat the dry sweet gas. The hydrogen introduced into the hydrodesulfurization system can be pure or blended with other components, including methane, non-methane alkanes, inert gases and carbon oxides. An embodiment of the SOFC system couples the hydrodesulfurization system to the CO2 separations system to permit at least a portion of the hydrogen-rich gas that forms in the CO2 separations system to pass into the hydrodesulfurization system as a system recycle. An embodiment of the SOFC process includes introducing a portion of the hydrogen-rich gas that forms in the CO2 separations system into the hydrodesulfurization system for use as a hydrotreatment feed.

The hydrogenolysis reaction occurs in the presence of the hydrotreatment catalyst. Examples of useful hydrotreatment catalyst include catalyst where the active metal component comprises molybdenum, ruthenium, nickel, tungsten or cobalt on a high-surface area catalyst support. Examples of catalyst support include metal oxides such as $\alpha$- and $\gamma$-alumina.

An embodiment of the SOFC process includes preheating the dry sweet process gas before introduction into the hydrodesulfurization system to a temperature in a range of from about 300° C. to about 400° C.

The SOFC system includes a sorption bed. The sorption bed couples to and receives treated process gas as a feed from the hydrodesulfurization system. The sorption bed is operable to extract the compounds that can be absorbed on the sorption bed material contained in the sorption bed in the introduced treated process gas to form a desulfurized process gas. Although only in the parts-per-million concentration, the hydrogen sulfide and ammonia from converting sulfur and nitrogen-bearing heterorganic compounds can poison the reforming catalyst downstream over an extended period of exposure. The desulfurized process gas includes methane and non-methane alkanes, inerts, and trace amounts of hydrogen, carbon oxides and water. The desulfurized process gas is substantially free of sulfur and sulfur-bearing compounds on a mole basis.

The sorption bed contains metal oxides operable to bond with hydrogen sulfide and ammonia. Example metal oxides include tin oxides, iron oxides ("iron sponges") and zinc oxides. The metal oxides also remove carbon dioxide from the treated process gas. The reaction of hydrogen sulfide with the metal oxide forms water.

An embodiment of the SOFC process includes maintaining, the treated process gas temperature in a range of from about 200° C. to about 450° C. in the sorption bed. The temperature range promotes desulfurization well as heats the pre-reformer.

Pre-Reformer

The SOFC system includes a pre-reformer. The pre-reformer couples to and receives desulfurized process gas as a feed from the sorption bed. The pre-reformer is operable to convert the non-methane alkanes in the desulfurized process gas with steam and in the presence of a pre-reforming catalyst into methane and carbon oxides. The conversion of the non-methane alkanes into methane and carbon oxide converts the desulfurized process gas into a reformed process gas rich in methane and carbon dioxide while lean in hydrogen and carbon monoxide.

The desulfurized process gas introduced into the pre-reformer is a hydrocarbon-rich gas stream comprising methane and non-methane alkanes with minor amounts of carbon oxide, mostly carbon dioxide, and some inert gases. An embodiment of the SOFC process includes introducing desulfurized process gas into the pre-reformer having methane in the range of from about 51 to about 66 mole percent of the composition, non-methane alkanes in a range of from about 33 to about 45 mole percent of the composition, carbon oxides in a range of from about 0.1 to about 1 mole percent of the composition, and inerts in a range of from about 1 to about 3 mole percent of the composition. The desulfurized process gas is substantially free of sulfur and sulfur-bearing compounds on a mole basis. The desulfurized process gas composition is on a dry basis. An embodiment of the SOFC process includes introducing desulfurized process gas having a mole percent ratio of methane to non-methane alkanes in a range of from about 1.0 to about 2.0. An embodiment of the SOFC process includes introducing the desulfurized process gas into the pre-reformer where the desulfurized process gas has a temperature in a range from about 350° C., to about 400° C.

The pre-reforming process uses steam to reform the desulfurized process gas. The steam used can be wet, dry or superheated. Steam provides water to the pre-reformer for the reforming reactions as well as intrinsic heat to support the reforming reactions. An embodiment of the SOFC process includes introducing superheated steam into the pre-reformer where the superheated steam has a temperature in a range of from about 250° C. to about 500° C. and a pressure in a range of from about 8 bars to about 12 bars. Preferably, the steam originates from fresh or recycled boiler feed water (BFW) or steam condensate to ensure minimizing the likelihood of introducing contaminants into the pre-reformer.

The steam-to-carbon ratio (SCR) is the mole amount of water (in the form of steam) introduced into the pre-reformer versus the mole amount of hydrocarbons and other pre-reformer reactants introduced into the pre-reformer via the desulfurized process gas. Equation 1 defines the value of SCR:

$$\text{SCR} = \text{mole flow rate of } H_2O/(\text{mole flow rates of } H_2 + CO + C_{1-5}\text{alkanes}) \quad \text{(Eq. 1)}.$$

An embodiment of the SOFC process includes introducing steam into the pre-reformer such that the SCR has a value in a range of from about 0.5 to about 3.0. An embodiment of the method has a SCR in a range of from about 0.5 to about 1.5. An embodiment of the method has a SCR in a range of from about 1.5 to about 3.0. Although not intending to be bound by theory, the SCR in this range for the pre-reformer supports preferential formation of methane from higher-carbon hydrocarbons while minimizing the formation of carbon monoxide and hydrogen.

Temperature management of the pre-reformer be adiabatic, isothermal or through any operational techniques known in the petroleum refining and process industry to produce methane-rich process gas for use in the solid oxide fuel cell. An embodiment of the SOFC process includes operating the pre-reformer adiabatically. Although not intending to be bound by theory, it is believed that adiabatic operations while also limiting the amount of water introduced by superheating the steam causes the non-methane alkanes to preferentially reform into methane and carbon dioxide while preventing significant formation of hydrogen and carbon monoxide, which are more typical of full reforming and syngas production. An embodiment of the SOFC process includes where the temperature of the formed reformed process gas produced by the pre-reformer is in a range of from about 55° C. to about 80° C. lower than the temperature of the introduced desulfurized process gas.

The reformation reaction occurs in the presence of the pre-reforming catalyst. The pre-reformer catalyst is contained in a catalyst bed within the pre-reformer and is in fluid contact with the combined steam and desulfurized process gas. The active metal reforming catalyst material is preferably comprised of at least one Group 8-10 metal, and more preferably is nickel. Examples of metals useful as active metal reforming catalysts include cobalt, lanthanum, platinum, palladium, iridium, rhodium, osmium, nickel, iron and ruthenium. Nickel is preferred due to activity, low cost and ready availability. Examples of useful catalyst carrier materials include metal oxides and mixed metal oxides (MMO), such as α- and γ-alumina, magnesium-aluminum oxides, cerium oxides, cerium-zirconium oxides, manganese oxides, lanthanum oxides, niobium oxides, molybdenum oxides, calcium-aluminate, zinc oxides, silicone oxides and titanium oxides. Although not intending to be bound by theory, many metal oxides and mixed metal oxides are suspected of catalytic activity and are therefore operable as co-catalysts in reformation.

The produced reformed process gas is a methane rich syngas. An embodiment of the SOFC process includes creating a reformed process gas having a methane composition in a range of from about 78 to about 88 mole percent of the composition, carbon oxides in a range of from about 9 to about 12 mole percent of the composition, hydrogen in a range of from about 0.5 to about 10 mole percent of the composition and inerts in a range of from about 0.5 to about 2 mole percent of the composition. The reformed process gas described is on a dry basis. An embodiment of the SOFC process includes forming a reformed process gas having a carbon dioxide composition of at least 10 mole percent of the composition. An embodiment of the SOFC process includes forming a reformed process gas that is substantially free of non-methane alkanes on a mole basis. An embodiment of the SOFC process includes forming a reformed process gas that is substantially free of sulfur and sulfur-bearing compounds on a mole basis.

The methane selectivity ratio (MSR) of the reformed process gas is the amount of methane versus the amount of methane plus other syngas products (carbon monoxide and hydrogen). The MSR is a reflection of the efficiency in which the pre-reformer converts non-methane alkanes into methane while avoiding complete reformation into syngas products. Equation 2 defines the value of MSR for the reformed process gas:

$$MSR = CH_4 \text{ mole \%}/(CH_4 \text{ mole \%} + H_2 \text{ mole \%} + CO \text{ mole \%}) \quad \text{(Eq. 6)}.$$

An embodiment of the SOFC process includes operating the pre-reformer such that the MSR value for the reformed process gas is in a range of from about 0.90 to about 0.99. An embodiment of the SOFC process includes where the MSR for the reformed process gas in a range of from about 0.93 to about 0.99. An embodiment of the SOFC process includes where the MSR for the reformed process gas in a range of from about 0.97 to about 0.99. Operating the pre-reformer such that the reformed process gas MSR value approaches 1 is desirable to maximize the internal reforming capacity of the solid oxide fuel cell.

Solid Oxide Fuel Cell

The SOFC system includes a solid oxide fuel cell. The solid oxide fuel cell has an anode side and a cathode side coupled by and in fluid contact with a solid ion-conducting material. The solid ion-conducting material is operable to transport oxygen ions from the cathode side to the anode side. The anode side of the solid oxide fuel cell couples to and receives reformed process gas as a feed from the pre-reformer. The anode side is operable to convert methane in the introduced reformed process gas with oxygen ions into carbon dioxide and water. The conversion of methane into carbon dioxide and water forms an anode off-gas rich in carbon dioxide, water, and optionally some hydrogen, carbon monoxide and unreacted alkanes. An embodiment of the SOFC process includes where the temperature of the anode off-gas is around 1000° C.

The cathode side of the solid oxide fuel cell receives compressed air introduced as a feed. The cathode side is operable to extract oxygen ions from the oxygen molecules present in the introduced air using an electrical current to ionize the compressed air. Extraction of oxygen ions from the compressed air feed produces a cathode off-gas that is oxygen depleted. The extracted oxygen anions transport through the solid ion-conducting material to the anode side. An embodiment of the SOFC process includes having the cathode off-gas preheat the compressed air feed.

The solid oxide fuel cell is operable to produce electricity. Free electrons released by the conversion of methane forms a direct current. The electrical current cycles from the anode side to the cathode side of the solid oxide fuel cell to extract oxygen. At least a portion, if not all, of the excess electrical current produced by the methane conversion over the need to ionize oxygen passes from the solid oxide fuel cell as the surplus electricity product of the SOFC process.

The conversion of the introduced reformed process gas occurs in the presence of a reforming catalyst and an electrochemical conversion catalyst. An embodiment of the SOFC system includes a SOFC system operable to permit direct internal reforming on the anode side of the solid oxide fuel cell. In direct internal reforming, the reforming reactions that convert methane and water into hydrogen and carbon oxides occur in the same compartment where oxygen ions permeate into and react with hydrogen and carbon oxides to form water and carbon dioxide. An embodiment of the SOFC system includes a SOFC system operable to permit indirect internal reforming on the anode side of the solid oxide filet cell. In indirect internal reforming (that is, integrated reforming), reformation of the methane into hydrogen and carbon oxides occurs in a first section or compartment that contains reformer catalyst. The electrochemical conversion reaction of the syngas into water and carbon dioxide occurs in a second section or compartment that contains the electrochemical conversion catalyst. To optimize internal energy usage, configurations of the integrated reforming anode side utilizes heat from the exothermic reaction in the second section to foster the endothermic reaction in the first section.

Water-Gas Shift Reactor System

The SOFC system optionally includes a water-gas shift reactor system. In some cases the anode off-gas contains a minor portion of carbon monoxide that negatively impacts refined carbon dioxide quality. The optional water-gas shift reactor improves carbon dioxide percent in the gas egressing from the system. When included as part of the SOFC systems, the water-gas shift reactor couples to and receives anode off-gas as a feed from the anode side of the solid oxide fuel cell. The water-gas shift reactor is operable to convert carbon monoxide in the anode off-gas with water in the presence of a water-gas shifting catalyst into carbon dioxide and hydrogen. The conversion of carbon monoxide into carbon dioxide converts the anode off-gas into a shifted anode off-gas mostly comprising carbon dioxide, water and hydrogen. The shifted anode off-gas is substantially free of carbon monoxide.

The water-gas shifting reaction occurs in the presence of at least one type of catalyst. High-temperature shift catalyst is useful for high inlet concentrations of carbon monoxide and high inlet anode off-gas temperatures. Examples of high-temperature shift catalyst include iron oxides, such as magnetite, with other metal oxide promoters or co-catalysts, including chromium oxide. Low-temperature shift catalyst is useful for lower temperature process gas, has higher selectivity, and promotes the water shift reaction even in the presence of high hydrogen concentrations. An example of low-temperature shift catalyst includes copper-based catalyst on a mixed zinc oxide/alumina carrier.

An embodiment of the SOFC process includes precooling the anode off-gas before introduction into the water-gas shift reactor system to a temperature in a range of from about 225° C. to about 300° C.

In SOFC systems that do not include the water-gas shift reactor system, a heat exchanger can cool the anode off-gas such that the vaporous water in the anode off-gas condenses and drops out of the gas phase. An embodiment of the SOFC system that does not include the water-gas shift reactor system recycles a portion of the gas exiting from the anode side back to the anode side feed to complete fuel utilization.

CO2 Separations and Dehydration Systems

The SOFC system includes a CO2 separations system. An embodiment of the SOFC system includes the CO2 separations system that couples to and receives anode off-gas from the anode side of the solid oxide fuel cell. An embodiment of the SOFT, system includes the CO2 separations system that couples to and receives shifted anode off-gas from the water-gas shift reactor system. The anode off-gas feed (shifted or not) contains a significant amount of carbon dioxide that is selectively recoverable. The CO2 separations system is operable to extract carbon dioxide from the introduced anode off-gas (shifted or not). The SOFC system process is also operable to extract water from the introduced anode off-gas. Upon removing both carbon dioxide and water from the introduced anode off-gas, both a carbon dioxide-rich gas and a hydrogen-rich gas form as system products. The carbon dioxide-rich gas is at least 95% carbon dioxide on a mole basis.

The hydrogen-rich gas product contains a significant portion of hydrogen along with inerts and methane. The hydrogen-rich gas is suitable for use as a hydrogen source for external power or heat generation processes, and for internally recycling. An embodiment of the SOFC system couples the hydrodesulfurization system to the CO2 separations system to provide at least a portion of the hydrogen-rich gas to the hydrodesulfurization system as a recycle stream. An embodiment of the SOFC process includes introducing a portion of the hydrogen-rich gas formed in the CO2 separations system into the hydrodesulfurization system for hydrotreatment.

The CO2 separations system preferably uses a reactive liquid or a selective polymer membrane separations system to separate the carbon dioxide from the anode off-gas. An embodiment of the SOFC system includes a CO2 separations system that utilizes reactive liquids to extract carbon dioxide from the anode off-gas, forming the carbon dioxide-rich gas and the hydrogen-rich gas. An embodiment of the SOFC system includes a CO2 separations system that utilizes a physical solvent to extract carbon dioxide. Examples of reactive liquids and physical solvents include those previously described with the acid gas removal system. An embodiment of the SOFC system includes a CO2 separations system that utilizes a membrane separations process that extracts carbon dioxide from the anode off-gas, forming a hydrogen-rich gas retentate and a carbon dioxide-rich gas permeate. Examples of useful membrane separations materials include polyamides, polysemicarbazides, polycarbonates, polyarylates, poly(phenylene oxides), polydimethylsiloxanes, polyanilines, polypyrrolones, polyimides, polyamide-imide blends, and carbon-based membranes made from pyrolyzing resins, surfactants, graphite or polymer structures. Useful membrane separations materials and systems include those provided by Membrane Technology & Research (Newark, Calif.) for separating carbon dioxide from hydrogen-rich off-gas. An embodiment of the SOFC system includes a CO2 separations system that utilizes cryogenically chilled liquids similar to that described in regards to the condensate removal system. An embodiment of the SOFC system includes a CO2 separations system that utilizes pressure swing absorption (PSA) to extract carbon dioxide and produce a carbon dioxide-rich product stream.

The SOFC system includes a CO2 dehydration system. The CO2 dehydration system couples to and receives the carbon dioxide-rich gas stream from the CO2 separations system. An embodiment of the SOFC system includes a CO2 dehydration system operable to receive and process the carbon dioxide-rich gas stream from the acid gas removal system. The CO2 dehydration system is operable to separate any remaining water from the carbon dioxide-rich gas to form a purified carbon dioxide suitable for export from the SOFC system as a system product. The purified carbon dioxide product is suitable for use in EOR operations or as a petrochemical feed stock. The purified carbon dioxide product is at least 95% carbon dioxide on a mole basis. An embodiment of the SOFC process includes where the purified carbon dioxide product is at least 98% carbon dioxide on a mole basis. An embodiment of the SOFC process includes where purified carbon dioxide is substantially free of non-carbon dioxide components on a mole basis. An embodiment of the SOFC process includes where the purified carbon dioxide is maintained at about 150 bars pressure at ambient temperatures.

An embodiment of the SOFC process includes the step of liquefying the purified carbon dioxide product to from a liquid purified carbon dioxide. Liquid carbon dioxide is easier to transport over longer distances and to store than vaporous carbon dioxide. Those of ordinary skill in the art understand and appreciate the compression and refrigeration technology suitable for liquefying purified carbon dioxide.

Method of Enhancing Hydrocarbon Fluid Recovery from a Hydrocarbon-Bearing Formation Using a SOFC System The SOFC system is operable to enhance hydrocarbon fluid recovery from a hydrocarbon-bearing formation that contains a hydrocarbon fluid using associated gas. The hydrocarbon-bearing formation is accessible through a production well. The production well permits production of hydrocarbon fluid from the hydrocarbon-bearing formation to the surface. The hydrocarbon-bearing formation is also accessible through a separate injection well. The injection well permits introduction of EOR fluids into the hydrocarbon-bearing formation, which enhances recovery of the hydrocarbon fluid.

The method of enhancing hydrocarbon fluid recovery using the associated gas from a hydrocarbon fluid includes the step of producing the hydrocarbon fluid from the hydrocarbon-bearing formation using the production well. The method includes the step of separating the associated gas from the produced hydrocarbon fluid. The method includes the step of introducing the associated gas into the SOFC system. The method includes the step of operating the SOFC system to produce a refined carbon dioxide product. The method includes the step of introducing the refined carbon dioxide product into the hydrocarbon-bearing formation through the injection well.

Supporting Equipment

Embodiments include many additional standard components or equipment that enables and makes operable the described apparatus, process, method and system. Examples of such standard equipment known to one of ordinary skill in the art includes heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or combinations thereof.

Examples of specific embodiments facilitate a better understanding of solid oxide fuel cell system and process. In no way should the Example limit or define the scope of the invention.

EXAMPLES

Tables 1-4 show several ASPEN process simulator (Aspen Technologies; Burlington, Mass.) modeling results for a portion of the SOFC system shown in FIG. 1. Specifically, the simulations model the behavior of the pre-reformer at various conditions, including the desulfurized process gas composition, reformation temperature and SCR. The model shows the expected reformed process gas composition. Eq. 1 is the basis for determining the SCR value for each modeling simulation. Eq. 2 is the basis for determining the value of MSR for each expected reformed process gas composition. Tables 1-4 show the entered and produced values on a dry mole percent basis.

TABLE 1

Pre-reformer Inlet and Outlet Compositions
Dry mole % basis; Temperature = 300° C.

| SCR: Components | Desulfurized Process Gas Composition mole % | Reformed Process Gas Composition | | |
|---|---|---|---|---|
| | | 0.5 mole % | 1.0 mole % | 1.5 mole % |
| C2H4 | 56.87 | 87.89 | 86.80 | 85.94 |
| C2H6 | 22.79 | 0.00 | 0.00 | 0.00 |
| C3H8 | 12.38 | 0.00 | 0.00 | 0.00 |
| C4H10 | 4.27 | 0.00 | 0.00 | 0.00 |
| C5H12 | 1.63 | 0.00 | 0.00 | 0.00 |
| CO | 0.00 | 0.03 | 0.01 | 0.01 |
| CO2 | 0.42 | 10.36 | 10.51 | 10.62 |
| H2 | 0.00 | 0.75 | 1.71 | 2.46 |
| H2S | 0.00 | 0.00 | 0.00 | 0.00 |
| N2 | 1.64 | 0.98 | 0.97 | 0.96 |
| S | 0.00 | 0.00 | 0.00 | 0.00 |
| MSR: | | 0.99 | 0.98 | 0.97 |

Three expected reformed process gas compositions formed using a pre-reformer operating in a SOFC system at 300° C. with three different steam-to-carbon ratios (SCR) for a given desulfurized process gas composition feed.

TABLE 2

Pre-reformer Inlet and Outlet Compositions
Dry mole % basis; Temperature = 300° C.

| SCR: Components | Desulfurized Process Gas Composition mole % | Reformed Process Gas Composition | | |
|---|---|---|---|---|
| | | 0.5 mole % | 1.0 mole % | 1.5 mole % |
| C2H4 | 59.73 | 87.56 | 86.47 | 85.59 |
| C2H6 | 19.81 | 0.00 | 0.00 | 0.00 |
| C3H8 | 11.17 | 0.00 | 0.00 | 0.00 |
| C4H10 | 4.41 | 0.00 | 0.00 | 0.00 |
| C5H12 | 1.90 | 0.00 | 0.00 | 0.00 |
| CO | 0.00 | 0.02 | 0.01 | 0.01 |
| CO2 | 0.45 | 10.04 | 10.19 | 10.31 |
| H2 | 0.00 | 0.82 | 1.79 | 2.57 |
| H2S | 0.00 | 0.00 | 0.00 | 0.00 |
| N2 | 2.54 | 1.55 | 1.53 | 1.52 |
| S | 0.00 | 0.00 | 0.00 | 0.00 |
| MSR: | | 0.99 | 0.98 | 0.97 |

Three expected reformed process gas compositions formed using a pre-reformer operating in a SOFC system at 300° C. with three different steam-to-carbon ratios (SCR) for a given desulfurized process gas composition feed.

TABLE 3

Pre-reformer Inlet and Outlet Compositions
Dry mole % basis; Temperature = 400° C.

| SCR: Components | Desulfurized Process Gas Composition mole % | Reformed Process Gas Composition | | |
|---|---|---|---|---|
| | | 0.5 mole % | 1.0 mole % | 1.5 mole % |
| C2H4 | 56.87 | 85.58 | 81.79 | 78.98 |
| C2H6 | 22.79 | 0.01 | 0.00 | 0.00 |
| C3H8 | 12.38 | 0.00 | 0.00 | 0.00 |
| C4H10 | 4.27 | 0.00 | 0.00 | 0.00 |
| C5H12 | 1.63 | 0.00 | 0.00 | 0.00 |
| CO | 0.00 | 0.35 | 0.19 | 0.16 |
| CO2 | 0.42 | 10.41 | 11.02 | 11.41 |
| H2 | 0.00 | 2.70 | 6.07 | 8.55 |
| H2S | 0.00 | 0.00 | 0.00 | 0.00 |
| N2 | 1.64 | 0.96 | 0.93 | 0.90 |
| S | 0.00 | 0.00 | 0.00 | 0.00 |
| MSR: | | 0.97 | 0.93 | 0.90 |

Three expected reformed process gas compositions formed using a pre-reformer operating in a SOFC system at 400° C. with three different steam-to-carbon ratios (SCR) for a given desulfurized process gas composition feed.

TABLE 4

Pre-reformer Inlet and Outlet Compositions
Dry mole % basis; Temperature = 400° C.

| SCR: Components | Desulfurized Process Gas Composition mole % | Reformed Process Gas Composition | | |
|---|---|---|---|---|
| | | 0.5 mole % | 1.0 mole % | 1.5 mole % |
| C2H4 | 59.73 | 85.05 | 81.26 | 78.40 |
| C2H6 | 19.81 | 0.01 | 0.00 | 0.00 |
| C3H8 | 11.17 | 0.00 | 0.00 | 0.00 |
| C4H10 | 4.41 | 0.00 | 0.00 | 0.00 |
| C5H12 | 1.90 | 0.00 | 0.00 | 0.00 |
| CO | 0.00 | 0.31 | 0.18 | 0.15 |
| CO2 | 0.45 | 10.14 | 10.75 | 11.15 |
| H2 | 0.00 | 2.97 | 6.35 | 8.87 |
| H2S | 0.00 | 0.00 | 0.00 | 0.00 |
| N2 | 2.54 | 1.51 | 1.46 | 1.42 |
| S | 0.00 | 0.00 | 0.00 | 0.00 |
| MSR: | | 0.96 | 0.93 | 0.00 |

Three expected reformed process gas compositions formed using a pre-reformer operating in a SOFC system at 400° C. with three different steam-to-carbon ratios (SCR) for a given desulfurized process gas composition feed.

What is claimed is:

1. A method for producing a purified carbon dioxide product suitable for enhanced oil recovery (EOR) and surplus electricity from a vaporous hydrocarbon feed using a solid oxide fuel cell (SOFC) system, the method comprising the steps of:
    introducing the vaporous hydrocarbon feed into the SOFC system;
    introducing steam into a pre-reformer of the SOFC system; and
    operating the SOFC system such that a desulfurized process gas forms and passes into the pre-reformer; a reformed process gas forms in the pre-reformer by converting non-methane alkanes in the desulfurized process gas into methane and carbon oxides in the presence of a pre-reforming catalyst; the reformed process gas passes from the pre-reformer into a solid oxide fuel cell; gas egressing from an anode side of the solid oxide fuel cell is improved by a water-gas shift reactor coupled to the anode side of the solid oxide fuel cell to receive anode off-gas as a feed, and configured to increase the percent composition of carbon dioxide in the gas egressing from the solid oxide fuel cell; and the purified carbon dioxide product and surplus electricity are produced;
    where the anode side receives methane-rich reformed process gas as a feed directly from the pre-reformer, the solid oxide fuel cell operable to produce electricity through internal reforming,
    where the SOFC system is operable to both receive the vaporous hydrocarbon feed and produce the desulfurized process gas, the purified carbon dioxide product and surplus electricity, and
    where the SOFC system includes the pre-reformer that fluidly couples directly to the anode side of the solid oxide fuel cell and is operable to both receive the desulfurized process gas and convert the non-methane alkanes using steam in the presence of an active metal pre-reforming catalyst into methane and carbon oxides, and the solid oxide fuel cell that is operable to produce electricity.

2. The method of claim 1 where the vaporous hydrocarbon feed comprises associated gas.

3. The method of claim 1 where introduced steam is superheated steam and has a temperature in the range of from about 250° C. to about 500° C. and a pressure in a range of from about 8 bars to about 12 bars.

4. The method of claim 1 where the desulfurized process gas has a temperature in a range of from about 200° C. to about 450° C.

5. The method of claim 1 where a steam-to-carbon ratio (SCR) of the introduced steam to the desulfurized process gas is in a range of from about 1.5 to about 3.0.

6. The method of claim 1 where a methane selectivity ratio (MSR) of the reformed process gas is in a range of from about 0.90 to about 0.99.

7. The method of claim 1 where the desulfurized process gas comprises methane in a range of from about 51 to about 66 mole percent of the composition and non-methane alkanes in a range of from about 33 to about 45 mole percent of the composition, each on a dry basis of the desulfurized process gas.

8. The method of claim 7 where the desulfurized process gas has a mole percent ratio of methane to non-methane alkanes in a range of from about 1.0 to about 2.0.

9. The method of claim 1 where the reformed process gas comprises methane in a range of from about 78 to about 88 mole percent of the composition, carbon oxides in a range of from about 9 to about 12 mole percent of the composition, and hydrogen in a range of from about 0.5 to about 10 mole percent of the composition, each on a dry basis of the reformed process gas.

10. The method of claim 9 where the reformed process gas is substantially free of non-methane alkanes on a mole basis.

11. The method of claim 9 where the reformed process gas is substantially free of sulfur and sulfur-bearing compounds on a mole basis.

12. The method of claim 1 where the purified carbon dioxide product is substantially free of non-carbon dioxide components on a mole basis.

13. The method of claim 1 further comprising the step of:
    operating the SOFC system such that a carbon dioxide-rich gas forms in an acid gas removal system and passes into a CO2 dehydration system,
where the SOFC system further includes the acid gas removal system that fluidly couples to an upstream side of the pre-reformer and is operable to form a carbon dioxide-rich gas, and the CO2 dehydration system that fluidly couples to both a downstream side of the pre-reformer and the acid gas removal system.

14. The method of claim 1 further comprising the step of:
    operating the SOFC system such that a hydrogen-rich gas forms in a CO2 separations system and passing a portion of the hydrogen-rich gas to a hydrodesulfurization system;
where the SOFC system further includes a CO2 separations system that fluidly couples to a downstream side of the pre-reformer and is operable to form a hydrogen-rich gas, and the hydrodesulfurization system that fluidly couples to both the upstream side of the pre-reformer and the CO2 separations system.

* * * * *